United States Patent
Trasler

[15] 3,699,460
[45] Oct. 17, 1972

[54] OSCILLOSCOPE TIME BASE CIRCUITS

[72] Inventor: Paul Vincent Marie Brigstock Trasler, Farnborough, England

[73] Assignee: The Solartron Electronic Group Limited, Farnborough, England

[22] Filed: March 25, 1971

[21] Appl. No.: 127,977

[30] Foreign Application Priority Data

March 25, 1970 Great Britain..........14,625/70

[52] U.S. Cl..................................328/181, 307/228
[51] Int. Cl.............................................H03k 4/10
[58] Field of Search.....................328/181; 307/228

[56] References Cited

UNITED STATES PATENTS

| | | | |
|---|---|---|---|
| 3,559,082 | 1/1971 | Horn | 328/181 |
| 3,255,419 | 6/1966 | Knapton et al. | 307/228 |
| 3,040,273 | 6/1962 | Boff | 307/228 |

Primary Examiner—James W. Lawrence
Assistant Examiner—Harold A. Dixon
Attorney—William R. Sherman, Stewart F. Moore, Jerry M. Presson, Leonard R. Fellen and Roylance, Abrams, Berdo & Kaul

[57] ABSTRACT

An oscilloscope time base circuit providing two time bases, both triggered from a single trigger signal. A logic circuit ensures that the time bases trigger alternately: one time base triggers when the trigger signal next reaches a predetermined value after a preset time has elapsed since the other time base triggered, and the other time base triggers when the trigger signal next reaches a predetermined value after both time bases have returned to their starting states. The trigger signal's predetermined value also alternates so that the time bases each trigger at their own predetermined value.

5 Claims, 2 Drawing Figures

OSCILLOSCOPE TIME BASE CIRCUITS

This invention relates to time base circuits for oscilloscopes of the type where there are two time bases which can be triggered separately to provide various functions, which are well known in themselves and not described herein.

It is known to trigger one time base from a trigger pulse derived from a trigger signal and then to trigger the second time base when the ramp of the first time base reaches a certain level. The start of the second time base ramp is not then synchronized with respect to the trigger signal. It is also known to use two separate trigger circuits to trigger the two time bases. This enables each time base to be triggered by a trigger pulse derived from the trigger signal and provides complete flexibility in use of the two time bases but at the expense of having to provide two trigger circuits instead of one and of undue complexity of adjustment stemming from the use of independent trigger circuits.

An object of this invention is to provide a circuit which enables the two time base circuits i.e., two time base generators, to be triggered by pulses derived from the trigger signal by a single trigger circuit.

According to the present invention there is provided a time base circuit comprising a trigger circuit responsive to a trigger signal to generate trigger pulses when the trigger signal reaches a predetermined level, a first time base arranged to be triggered from a starting state by one of these trigger pulses to generate a ramp signal and a gating circuit arranged to allow a trigger pulse to pass to a second time base to trigger the same from a starting state after the said ramp signal has reached a preset level.

The preset level can be adjustable to allow the delay between the instants at which the two time bases are triggered to be adjusted. The said two instants are both determined by the trigger pulses, i.e. they are determined in relation to particular points in the trigger signal.

In an important development of the invention the said predetermined level alternates between two values, the first value obtaining until the time base has been triggered and the second value then obtaining at least until the second time base has been triggered. This enables the points in the trigger signal at which the two time bases are triggered to be different.

The invention will be described in more detail, by way of example, with reference to the accompanying drawings, in which.

The block diagram has deliberately been restricted to the essentials necessary to explain the invention, without showing all the alternative facilities for various modes of operation which would be provided in a commercial instrument.

Figure 1:
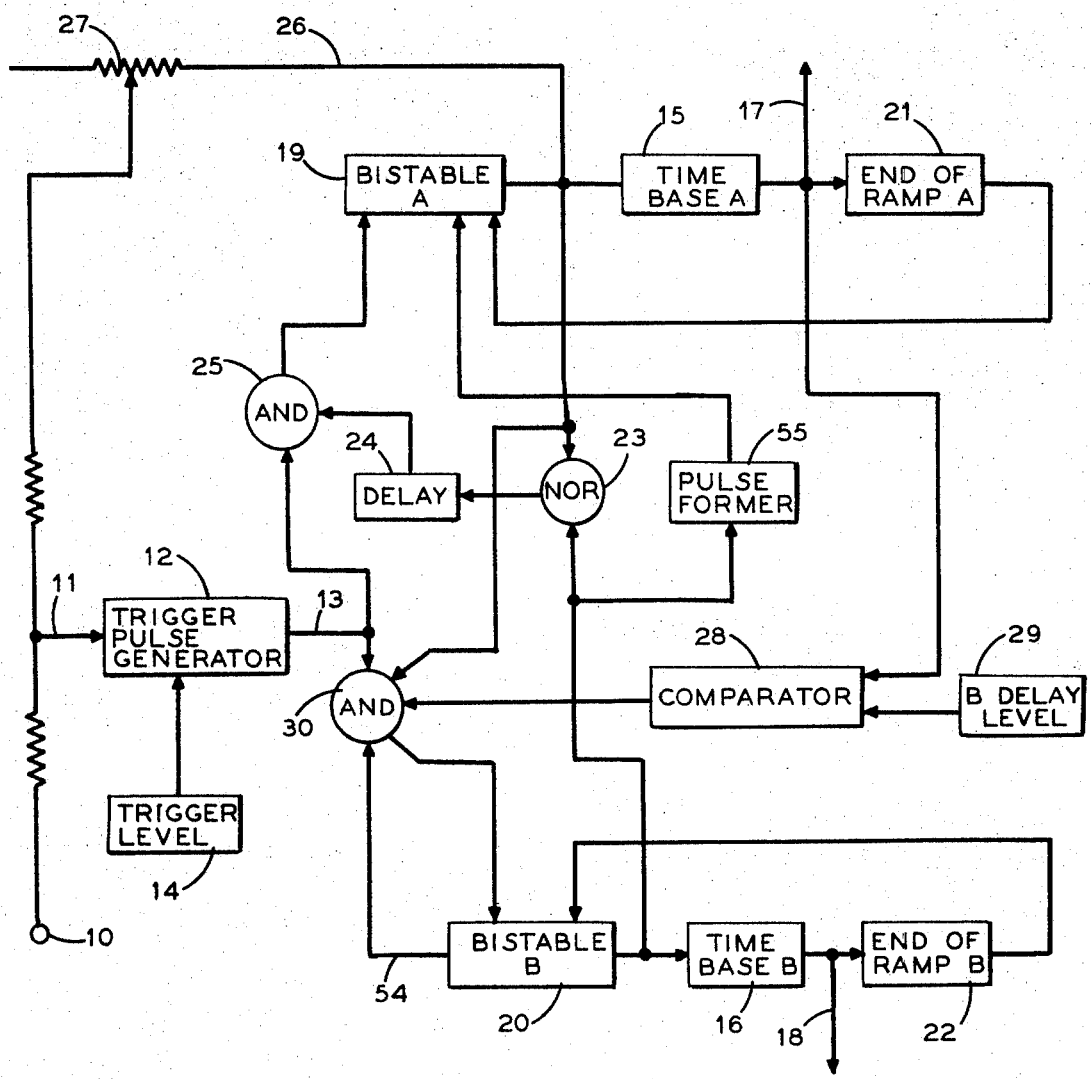
FIG. 1 is a block diagram of one embodiment of the invention.

In FIG. 1 the trigger signal is applied to a terminal 10 and thence to one input 11 of a trigger pulse generator 12 which generates a sharp trigger pulse on a line 13 when the signal level at input 11 reaches an adjustable, predetermined level provided by a circuit 14.

First and second time bases 15 and 16, called time base A and time base B, provide respective ramp signals on outputs 17 and 18. The time bases A and B commence to run when corresponding bistables 19 and 20 are set. When the ramps reach a certain level, end of ramp detectors 21 and 22 reset the corresponding bistables in well known manner. The output from the bistable circuit 20 to the B time base 16 is also coupled through a circuit 55 to reset input of bistable 19. When the B bistable resets its reset edge resets bistable 19 by way of circuit 55.

When both bistables have been reset, a NOR gate 23 provides a signal to a delay circuit 24 which establishes the required hold-off delay to AND gate 25. At the end of this delay the output of the circuit 24 enables the AND gate 25 which passes the next trigger pulse to set the A bistable 19 and thus start the A ramp.

When the bistable 19 is set its output changes and the potential thereby provided at line 26 is applied to an adjustable potential divider 27 which establishes a pedestal upon which the signal at the input 11 to the trigger pulse generator 11 is superimposed. Thus the effective level at which trigger pulses are generated is switched to a different value and the trigger pulses are now derived from a different point in the trigger signal waveform.

The A ramp on output 17 is applied to a comparator 28 whose other input is an adjustable level which presets the effective B ramp delay and is provided by a source 29. When the A ramp reaches the preset level the output of the comparator 28, in the form of a pulse of suitable duration, enables an AND gate 30 which allows the next trigger pulse through to set the B bistable 20 and commence the B ramp.

Figure 2:
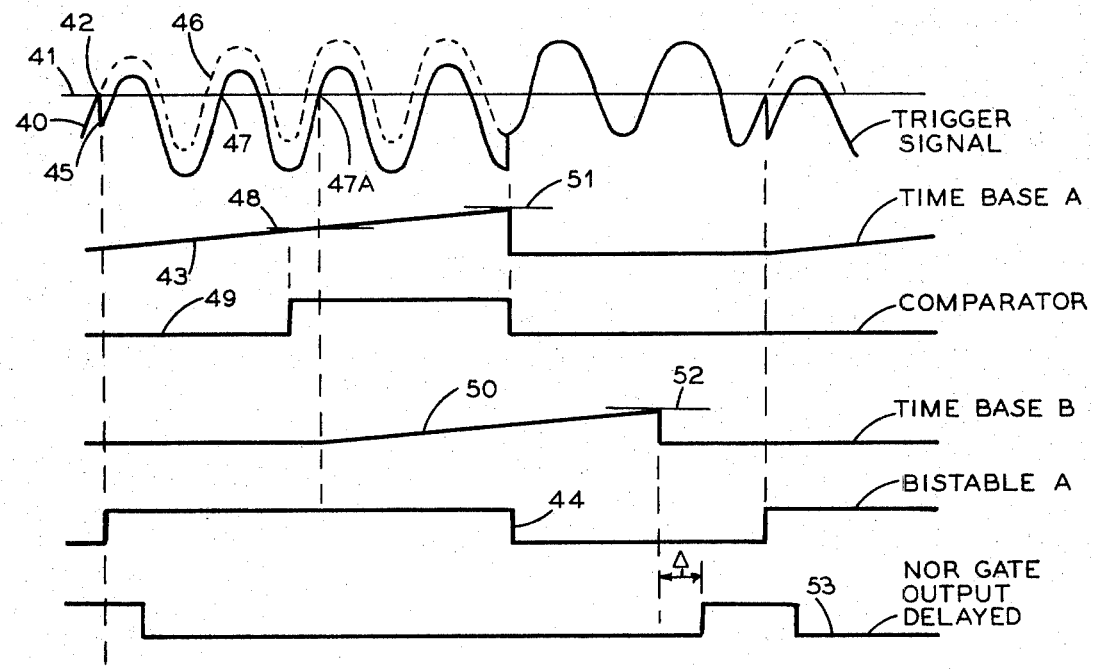
FIG. 2 shows explanatory waveforms.

FIG. 2 shows the trigger signal 40 and the predetermined trigger level at 41. When the trigger signal reaches the trigger level at point 42, the A bistable 19 is set, a ramp 43 is started and the output level 44 of the bistable 19 changes. In consequence the trigger signal level is shifted by the pedestal 45 established by the potentiometer 27, whereby the trigger point is shifted from point 46 to point 47. However as yet no further triggering takes place because both AND gates 25 and 30 are now closed.

When the A ramp 43 reaches the level 48 preset by the circuit 29 a pulse 49 generated by comparator 28 is applied to enable the gate 30. The next trigger pulse at point 47a then sets the B bistable 20 and the B ramp 50 commences.

The complementary output 54 of the B bistable 20 goes false and inhibits the passage of further trigger pulses through AND gate 30 to the B bistable.

The B ramp 50 will end when it reaches end of ramp level 52 determined by the circuit 22, the output of which resets bistable 20. When bistable 20 resets a pulse passes through the circuit 55 to reset the A bistable 19 and end the A ramp. The A ramp 43 will also end if it reaches end of ramp level 51 determined by circuit 21 before the B ramp has ended (as shown in FIG. 2). When the A bistable is reset the AND gate 30 is held closed and the level 44 changes causing the pedestal to be removed from the trigger signal 40.

The delayed signal shown at 53 goes true later, after the hold-off delay Δ to enable the gate 25 ready for the described cycle of operations to repeat.

The pedestal shift 45 can be introduced in any convenient manner, preferably so as to allow either sense of shift, whereby the B trigger points can be selectively retarded or advanced with respect to the A trigger points. Obviously the same results can be obtained by shifting the trigger level 41 instead of the trigger signal level. In either event the predetermined trigger level is effectively shifted relative to the trigger signal.

What is claimed is:

1. A time base circuit comprising
   a trigger circuit responsive to a trigger signal to generate trigger pulses when said trigger signal reaches a predetermined level,
   a first time base means for generating a first ramp signal when triggered from a starting state by a trigger pulse generated by said trigger circuit,
   a second time base means operable concurrently with said first time base, for generating a second ramp signal,
   means for detecting when said first ramp signal has reached a preset level, and
   a gating circuit responsive to said detecting means to allow the trigger pulse from said trigger circuit next subsequent to the arrival of said ramp signal at said level to pass to said second time base means to trigger the same from a starting state to generate said second ramp signal.

2. A time base circuit as claimed in claim 1 comprising a gating circuit for normally preventing trigger pulses from said trigger circuit reaching said first time base and responsive to said second time base completing its cycle of operations and returning to its starting state to allow trigger pulses to reach said first time base.

3. A time base circuit as claimed in claim 1, comprising means responsive to said second time base returning to its starting state to force said first time base into its starting state.

4. A time base circuit as claimed in claim 1, comprising means responsive to triggering of said first time base to alter said predetermined level relative to said trigger signal, whereby said predetermined level alternates between two values pertaining to said first and second time bases respectively.

5. A dual ramp signal generating apparatus comprising the combination of
   first circuit means for generating a periodic signal;
   second circuit means for generating a reference level signal,
   said first and second circuit means being adjustable to alter the relationship between said periodic signal and said reference level signal with any one of a plurality of points on a cycle of said periodic signal;
   first ramp generating circuit means responsive to the intersection of said reference level signal and said periodic signal for initiating generation of a first ramp;
   circuit means for sensing the arrival of said first ramp at a predetermined level for producing an enabling signal for a second ramp;
   second ramp generating circuit means responsive to an intersection of said reference level and said periodic signal, following the production of said enabling signal, for initiating generation of said second ramp while said first ramp is being generated; and
   means for shifting the relationship between said reference level signal and said periodic signal between the initiation of said first ramp and the initiation of said second ramp.

* * * * *